Dec. 26, 1961 K. HEHL 3,014,243
INJECTION MOLDING MACHINE
Filed May 29, 1959 2 Sheets-Sheet 2
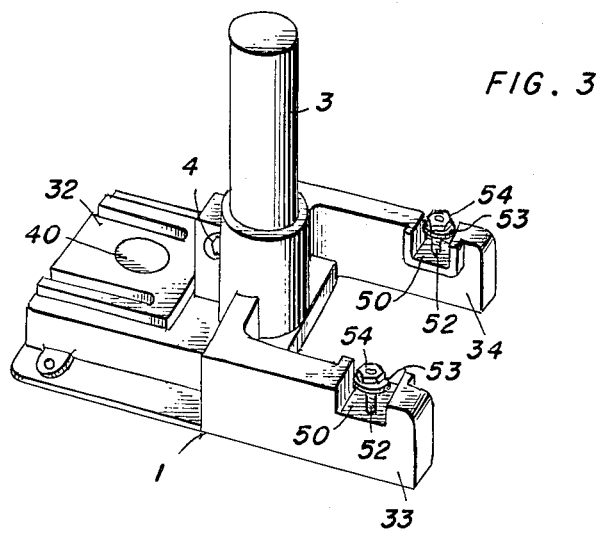
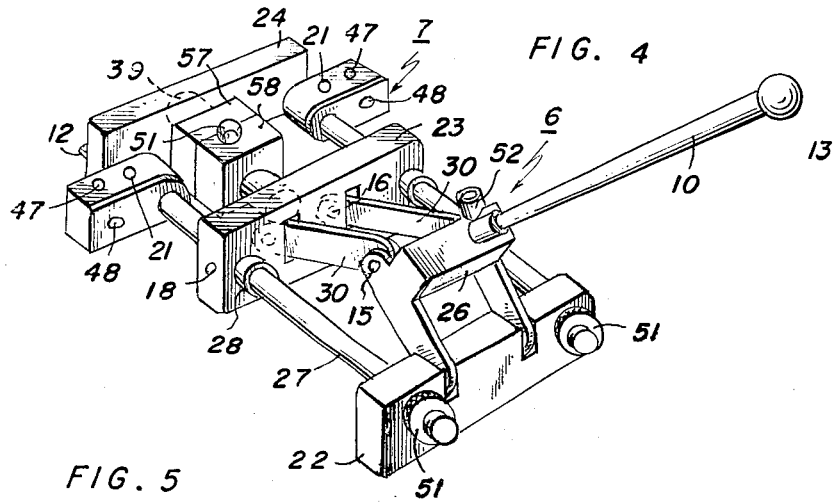
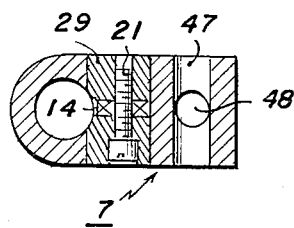
INVENTOR:
KARL HEHL
BY
PATENT AGENT

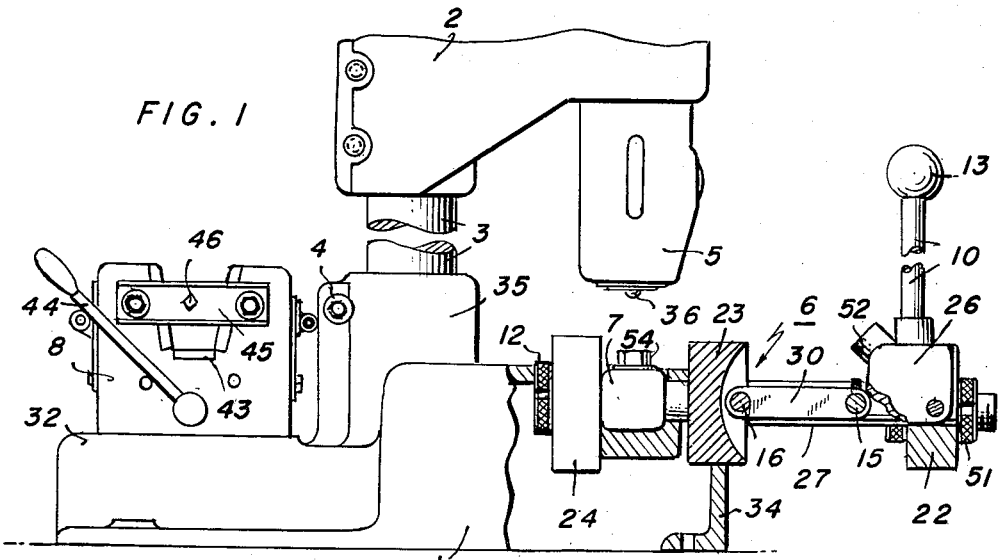
FIG. 1
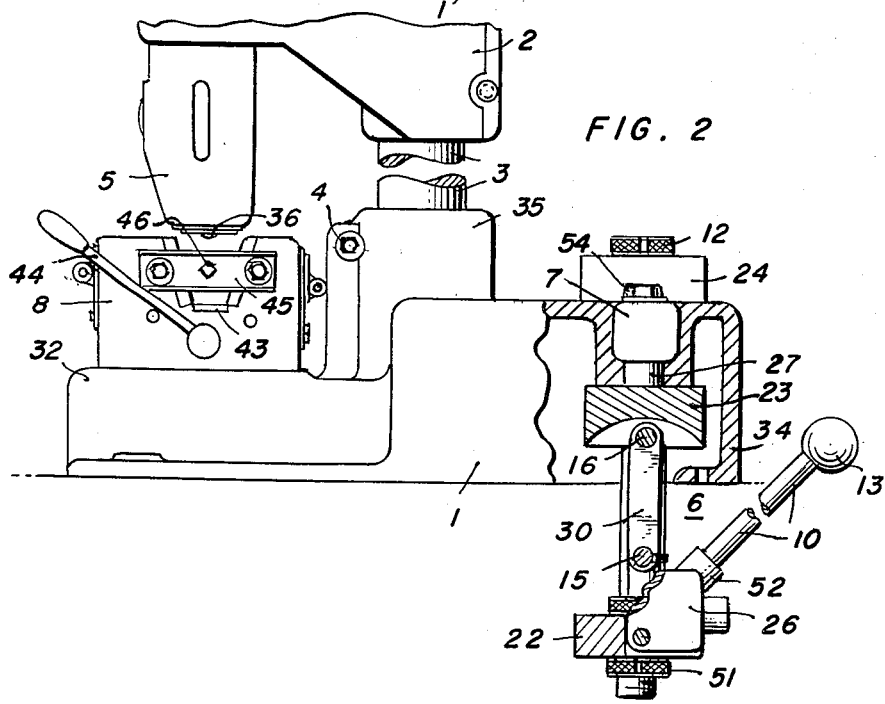
FIG. 2
INVENTOR:
KARL HEHL
BY
PATENT AGENT

United States Patent Office 3,014,243
Patented Dec. 26, 1961

3,014,243
INJECTION MOLDING MACHINE
Karl Hehl, Lossburg, Wurttemberg, Germany, assignor to Arburg-Feingerätefabrik O.H.G. Hehl & Söhne, Lossburg, Wurttemberg, Germany
Filed May 29, 1959, Ser. No. 816,746
Claims priority, application Germany May 30, 1958
13 Claims. (Cl. 18—30)

The present invention relates to mold clamping arrangements for a press, such as used for molding plastic materials. The invention is primarily concerned with injection molding apparatus for thermoplastic materials, although it is applicable to presses for molding of other materials.

It is an object of the present invention to provide in a molding machine, such as an injection molding press for molding thermoplastic materials, mold clamping means for at least two injection molds.

It is another object of the invention to dispose said clamping means in such a manner with respect to the molding machine that the ingates of the molds are provided on a base of this machine at equal distance from a supporting column carrying an injection unit, whereby said injection unit can be rotated and selectively fixed in position with respect to the supporting column and any injection molds so as to align the injection nozzle of said injection unit with the ingates of any of said molds.

It is a further object of the invention to provide for at least one of said mold clamping means a mounting surface to which a suitable mold clamping device can be secured.

It is another object of the invention to provide at least one other of said mold clamping means in the form of a toggle lever clamping assembly.

It is a still further object of the invention to provide at least one vertically disposed toggle lever mold clamping assembly for injection molding in a direction perpendicular to the mold parting line, said vertically disposed clamping assembly having provision for turning it to and fixing it in horizontal position for injection molding in a direction parallel with respect to the mold parting line.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURE 1 is a side elevation of an injection molding machine with a toggle lever mold clamping assembly in horizontal position, parts of the machine being shown in section.

FIGURE 2 is a side elevation of the injection molding machine illustrated in FIGURE 1 with the toggle lever mold clamping mechanism in vertical position, parts of the machine being shown in section.

FIGURE 3 shows a perspective view of the unassembled base of the machine of FIGURES 1 and 2, including a supporting column for the injection molding unit.

FIGURE 4 illustrates a perspective view of the toggle lever mold clamping mechanism mountable on the base of the machine of FIGURE 3 either in horizontal or in vertical position.

FIGURE 5 is a section through the mechanism of FIGURE 4 taken along line 5—5 and looking in the direction of the arrows.

In the molding machine shown in FIGURES 1, 2 and 3, a base 1 has approximately at its center a tubular socket 35 in which a supporting column 3 for a machine head 2 of an injection molding unit comprising a plasticizing cylinder 5 is received. The column 3 is clamped in the socket 35 by means of a clamping screw 4 which, when loosened, permits turning of the column 3 with the mounted injection molding unit from the position shown in FIGURE 1 to that shown in FIGURE 2, and vice versa.

As shown in FIGURE 3, the left portion of the base 1 is provided with a mounting plate 32, while the right portion of the base 1 forms a fork comprising two arms 33 and 34 which are parallel to one another and are adapted to support a toggle lever mold clamping assembly 6, shown in FIGURE 4, the two different positions of which are illustrated in FIGURES 1 and 2.

This toggle lever mold clamping assembly 6 comprises a stationary platen 24, a movable platen 23 which is displaceable with respect to the stationary platen 24, i.e., is slidable on and along guide rods 27 mounted with one of their threaded ends on the stationary platen 24 by means of nuts 12 and comprises an adjustable mounting member 22 for a toggle lever mechanism. The other ends of the guide rods 27 are passed through holes in the adjustable mounting member 22. The end portions of the guide rods 27 extending through the adjustable mounting member 22 are threaded and pairs of nuts on these threaded ends of the guide rods 27, between which the mounting member 22 is held, serve to adjust the closest distance between the movable platen 23 and the stationary platen 24, so that the clamping assembly 6 can be adjusted to clamp molds of different outer dimensions between the platens. Only the outer nuts 51 of the pairs of nuts on the guide rods 27 are visible in FIGURE 4.

The toggle lever mechanism comprises a bell crank lever 26 hingedly mounted on and with respect to the mounting plate 22, for example by pin means not visible in FIGURE 4. This bell crank lever 26 can be actuated by means of a handle 10 having at its free end a knob 13. Two parallel toggle levers 30 hingedly connect the bell crank lever 26 to the movable platen 23 by means of toggle pins 15 and 16.

The toggle lever mold clamping assembly 6, as shown in FIGURE 4, can be mounted in the forked portion of the base 1 either in the horizontal position shown in FIGURE 1, or in the vertical position shown in FIGURE 2. In either case, square-shaped mounting elements 7, adjustably attached to the guide rods 27 in a manner to be described below, can be inserted in U-shaped recesses 50 open at their tops and having exactly the same dimensions and being provided in the two arms 33 and 34 of the fork shown in FIGURE 3. A mounting or stay bolt 52, mounted with its lower end in the bottom wall of each of the recesses and extending either through a hole 47 (in case of horizontal assembly as shown in FIGURE 1) or through a hole 48 (in case of vertical assembly as shown in FIGURE 2), serves to secure the mounting elements 7 to the arms 33 and 34 with the aid of a washer 53 and a nut 54 on the end of each of the bolts 52.

If the assembly 6 is mounted on the arms 33 and 34 of the forked portion of the base 1 in the manner described, an accurate alignment of a nozzle orifice 36 of the plasticizing cylinder 5 with an ingate 55 of an injection mold 56 can be assured, said mold to be clamped in the mold clamping assembly 6 between the stationary platen 24 and the movable platen 23. The mold in FIGURE 4 is made of two parts 57 and 58, the parting plane of which is substantially parallel with respect to the clamping surfaces of the platens 23 and 24. The mold part 57 is suitably bolted to the stationary platen 24, while the part 58 will be merely frictionally engaged by the movable platen 23 when the clamping assembly 6 is in clamping position. In FIGURE 4, this assembly is in a position in which the part 58 of the mold is not engaged by the movable platen 23, so that the mold can be opened. In the engaging or clamping position of the assembly, the two parts of the mold 56 are accurately aligned with respect to one another and to the injection unit.

The mold clamping assembly 6 which, in FIGURE 1 is shown in horizontal position, can be removed from this position upon removal of the nuts 54 and washers 53 and lifting of the mounting elements from the recesses 50 in the fork arms 33 and 34, whereupon this assembly 6 can be turned 90° and secured in vertical position to these arms 33 and 34 and then be properly aligned with and below the nozzle orifice 36, as shown in FIGURE 2. A mold, similar to that shown in FIGURE 4 and also held between the platens 23 and 24, can then be injected through an opening 39 provided in the center of the stationary platen 24, such mold being turned with respect to the position of the mold in FIGURE 4, so that its ingate is at the side of said opening 39 and its parting plane is perpendicular with respect to the clamping surfaces of said platens.

As shown in FIGURE 5, each of the mounting elements 7 is provided with a bore in which one of the guide rods 27 is received and secured to the respective mounting element by means of a set screw 21 cooperating with a two-part locking sleeve 29. The two parts of this locking sleeve 29, inserted in a bore through the mounting element 7 disposed perpendicular with respect to the hole receiving the guide rod 27, are held apart by compression spring means 14 lodged between these two parts, the force of the spring means is overcome when, by tightening of the set screw 21, the two parts of the locking sleeve 29 are displaced towards each other.

The movable platen 23 is slidably mounted on the guide rods 27 by means of sintered bushings 28 (see FIGURE 4) pressed in openings at the ends of the movable platen 23 and secured therein with the aid of set screws 18.

When, according to FIGURES 1, 2 and 4, the bell crank lever 26 is lifted by means of a handle 10 and its knob 13, this bell crank lever 26 rocks about its pivot on the mounting plate 22. Due to the resulting lifting of the toggle pins 15 interconnecting the bell crank lever 26 and the two toggle levers 30, an opening movement between the movable platen 23 and the stationary platen 24 is obtained. The handle 10 can be mounted on the bell crank lever 26 in two positions, i.e., the position shown in FIGURES 1 and 4, and the position shown in FIGURE 2, so as to enable an easier handling of this mechanism by the operator in the respective operative positions of the clamping assembly illustrated in FIGURES 1 and 2. For this purpose, a separate receiving opening 52 for the handle 10 is provided in the bell crank lever 26 (see FIGURE 4).

As shown in FIGURE 3, the mounting plate 32 has a central opening 40. The distance of the center of this hole 40 from the axis of the supporting column 3 in a horizontal plane is equal to the distance of the center of the nozzle orifice 36 from this supporting column 3. The hole 40 is adapted to receive hydraulically, pneumatically or mechanically operated mold clamping units known per se. Fastening bolts (not shown) engaging guide grooves 41 and 42 (see FIGURE 3), provided in the mounting plate 32, may be employed to mount the mentioned hydraulically, pneumatically or mechanically operated clamping units.

According to FIGURES 1 and 2, a taper-jaw mold clamping unit 8 is mounted on said mounting plate 32. An injection mold (not shown) can be held in a conical recess formed by the jaws of said clamping unit. The dimensions of said recess can be varied by means of removable inserts. This conical recess is bordered at one side by an abutment bar 45 in which a screw 46 is provided to accurately adjust the position of the injection mold. After completing the injection molding operation, the mold held in the clamping unit 8 can be ejected by means of a vertically guided pusher member 43 which is actuated by a hand lever 44 controlled by means of an eccentric shaft (not shown).

Thus, according to the present invention, a multiple mold clamping apparatus for an injection molding press suitable for plastic and especially thermoplastic materials is provided, said apparatus comprising at least two mold clamping arrangements or units 6 and 8 for injection molds so disposed that the ingates of molds to be held in the two clamping units 6 and 8 are situated at equal distances from the supporting column 3 of the injection assembly, i.e., they can always be properly aligned with the head 2 and the plasticizing cylinder 5 of the injection assembly. This injection assembly on the supporting column 3 can be turned above the molds and locked in position by the screw 4 when aligned with the ingates of the molds. The new apparatus has at least one mounting surface 32 for securing a mold clamping mechanism, such as 8 for injection molds, while in at least one additional vertically disposed mold clamping arrangement for injection molding in a direction perpendicular to the mold parting line, there is provided the toggle lever clamping assembly 6 in such a manner, that it can be turned to the horizontal position and be secured in this position for injection molding in a direction parallel with the mold parting line. Due to the adjustable mounting of the mounting elements 7 on the guide rods 27 and of the mounting member 22 on the guide rods 27, it is possible to readily and accurately adjust the alignment of the ingates of the molds of different sizes with the nozzle of the plasticizing cylinder.

The multiple mold clamping apparatus according to the invention has the great advantage that it is possible to select the most favorable working position for the shape of the casting to be made in any particular case.

An injection direction parallel with respect to the mold parting line has proved to be adequate in case of castings of simple shapes where accuracy in dimensions is not important. In such case, the injection mold is suitably held in the horizontally placed toggle lever clamping assembly 6 (FIGURE 1).

If, as in case of plastic parts for time measuring instruments, a high precision is required or, as in the case of plastic shapes for plastic surgery, absolute faultlessness of the material is necessary, the injection has to take place in a direction perpendicular to the parting line of the injection mold. This holds true also for injection castings with inlaid metal parts. In all such cases, the injection mold must be held by means of the toggle lever clamping assembly disposed vertically (FIGURE 2).

In case of pneumatic or hydraulic control of the opening and closing operations of the injection mold mounted on the mounting plate 32 and above the hole 40, it is also possible to provide for injection in a direction perpendicular to the parting line of the injection mold.

When the injection mold is held in the tapered jaw clamping unit, as shown in FIGURE 2, the direction of injection is usually parallel with the parting line of the injection mold.

I claim:
1. An injection molding apparatus, comprising, in combination: a support; injection means arranged on said support and having an injection nozzle for injecting material in a predetermined direction; and clamping means constituted by a self-contained detachable unit adapted to hold a mold made up of two mold members and having an ingate, said clamping means being selectively mountable on said support in a first clamping position wherein the clamping force acts in the same perdetermined direction as that in which said injection nozzle injects material and in a second clamping position wherein the clamping force acts in a direction perpendicular to said predetermined direction, said clamping means, in either of its two positions, being so arranged on said support such that the ingate of the mold is in alignment with said injection nozzle and that the interengagement between said clamping means and said support occurs substantially in symmetry with said injection nozzle, whereby the force exerted by said injection means on a mold clamped by said clamping means will, irrespective of which of its positions said clamping means is in, cause no bending moments in said support.

2. An injection molding apparatus as defined in claim 1 wherein said first clamping position is one in which a mold clamped by said clamping means has its parting line substantially parallel to said predetermined direction and wherein said second clamping position is one in which a mold clamped by said clamping means has its parting line substantially perpendicular to said predetermined direction.

3. In an injection molding machine according to claim 2, wherein mounting elements are extending from two sides of said toggle lever mold clamping means, said elements having square cross sections, and wherein said fork arms are formed with recesses of exactly the same size as said square cross sections and adapted to receive said mounting elements selectively in said two positions.

4. In an injection molding machine according to claim 3, wherein each of said square-shaped mounting elements has two holes in directions perpendicular to one another, the axis of each of said holes being parallel with respect to one side of said square-shaped element, and wherein a bolt is attached to the bottom of each of said recesses, said bolt being passed through one of said holes to secure said mounting element to said arm.

5. In an injection molding machine according to claim 4, wherein said clamping means are constituted by a toggle lever mold clamping mechanism which comprises a stationary platen, two guide rods mounted on said platen perpendicularly with respect to the clamping surface thereof, a movable platen slidably mounted on said guide rods, toggle lever actuating means hingedly mounted between and cooperating with said platens so as to displace said movable platen with respect to said stationary platen by toggle action means to adjustably mount said mounting elements of said toggle lever mold clamping mechanism on said guide rods.

6. In an injection molding machine according to claim 5, wherein each of said mounting elements has a hole receiving one of said guide rods, wherein another hole is provided in said mounting elements, said holes partially intersecting one another, wherein a spring-pressed two-part sleeve is inserted in said second hole, said sleeve parts being adapted to frictionally engage said rod in said first hole and being biased by said spring to separate from one another and disengage from said rod, and wherein a bolt is threaded in said sleeve parts so as to move them together and in frictional engagement with said rod by tightening said bolt.

7. For use with an injection molding apparatus having an injection nozzle for injecting material in a predetermined direction, the combination which comprises: clamping means constituted by a self-contained detachable unit for clamping two mold members which are formed with complementary faces and which are adapted to be clamped together in face-to-face relationship to constitute a complete mold having an ingate; and mounting means for selectively mounting said clamping means in a first position wherein the juncture of the mold members, when the complete mold is clamped by said clamping means, is transverse to said predetermined direction and a second position wherein the juncture of the mold members, when the complete mold is clamped by said clamping means, is in a plane generally parallel to said predetermined direction, said mounting means being arranged to hold the ingate in alignment with said injection nozzle with said mounting means themselves being substantially symmetrical relative to the injection nozzle, whereby the force exerted by the injection nozzle on a mold clamped by said clamping means will, irrespective of whether said clamping means are in said first or second position thereof, cause no bending moments in said support.

8. An injection molding apparatus as defined in claim 1 wherein said predetermined direction is vertical.

9. The combination defined in claim 7, wherein said clamping means comprises an end plate and a ram between which the mold members may be clamped, said end plate being formed with an opening with which the ingate of the mold may be placed in alignment, thereby allowing the introduction of material into the mold when said clamping means are in said first position thereof.

10. The combination defined in claim 9 wherein said clamping means further comprise a toggle mechanism for pressing said ram and end plate together.

11. For use with an injection molding apparatus having an injection nozzle, a self-contained detachable clamping unit comprising, in combination: an end member; a ram mounted for movement relative to said end member, said end member and ram being adapted to clamp between themselves molds in two different positions, in one of said positions the ingate of the particular mold being clear of said end member, and in the other of said positions the ingate of the particular mold being pressed against said end member, the latter being formed with an opening which is in alignment with said ingate when said last-mentioned mold is clamped; and mounting means enabling said clamping unit to be attached to the injection molding apparatus in a position wherein the mold ingate, if clear of said end member, is in alignment with the injection nozzle, as well as in a position wherein said opening of said end member is in alignment with the injection nozzle, said mounting means themselves, when the clamping unit is attached to the injection molding apparatus, being substantially symmetrical relative to the injection nozzle, whereby the force exerted by the injection nozzle on a mold clamped by said clamping unit will, irrespective of whether said clamping unit is in said first or second position thereof, cause no bending moments in said support.

12. A clamping device as defined in claim 11 further comprising a toggle mechanism for pressing said end member and ram together.

13. A clamping device as defined in claim 11 wherein said mounting means comprise two mounting elements extending laterally of the clamping device, each mounting element being formed with two mutually perpendicular bores through which may pass mounting pins attached to the injection molding apparatus.

References Cited in the file of this patent

UNITED STATES PATENTS

| | | |
|---|---|---|
| 2,438,856 | Knowles | Mar. 30, 1948 |
| 2,442,607 | Leguillon et al. | June 1, 1948 |
| 2,526,877 | Jurgeleit | Oct. 24, 1950 |
| 2,688,159 | Swartz et al. | Sept. 7, 1954 |
| 2,711,567 | Knapp | June 28, 1955 |
| 2,803,853 | Brazier | Aug. 27, 1957 |